United States Patent [19]
Varni et al.

[11] Patent Number: 6,042,453
[45] Date of Patent: Mar. 28, 2000

[54] FRAME HOLDING BEE FEEDER

[76] Inventors: Walter Varni; Ricardo D. Aruzmendi, both of Ruta 33 km 134,5, Pigue, Buenos Aires, Argentina

[21] Appl. No.: 09/169,551

[22] Filed: Oct. 9, 1998

[51] Int. Cl.[7] .................................................. A01K 53/00
[52] U.S. Cl. .............................................. 449/48; 449/10
[58] Field of Search ..................................... 449/9, 10, 48

[56] References Cited

U.S. PATENT DOCUMENTS

| | | | |
|---|---|---|---|
| 200,506 | 2/1878 | Carter | 449/48 |
| 215,569 | 5/1879 | Byrd et al. | 449/9 |
| 1,046,507 | 12/1912 | Thale | 449/9 |
| 2,567,871 | 9/1951 | Briercliffe | 449/9 |

Primary Examiner—Robert P. Swiatek
Attorney, Agent, or Firm—James G. O'Neill

[57] ABSTRACT

A feeding container for bees supports frames in a hollow interior and is placed in the interior of a beehive, to both feed bees and divide the interior. The feeding container is parallelepiped in shape with an open top and a capacity to hold a large amount of feed and a plurality of frames, having standard Langstroth dimensions. The feeding container leaves a space of approximately 3 millimeters between its ends and the side walls of a beehive. The container is supported on a floor of the hive by legs formed in the container to provide a separation of about 8 millimeters from the floor to the base of the feeding container base to allow bees to crawl between the divided interior.

8 Claims, 2 Drawing Sheets

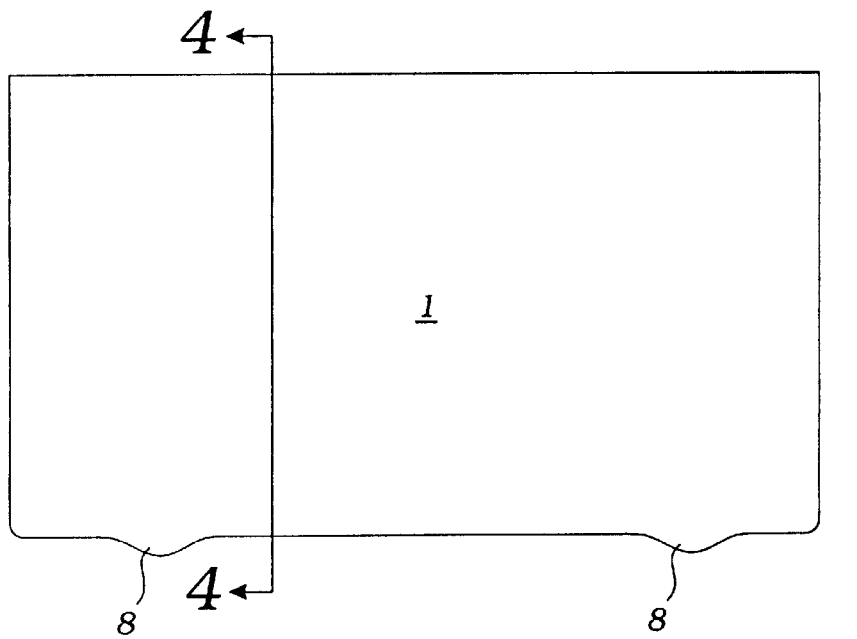
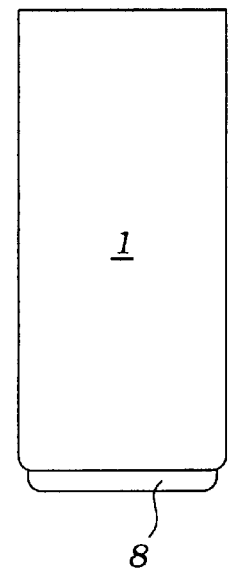
Fig. 3     Fig. 4
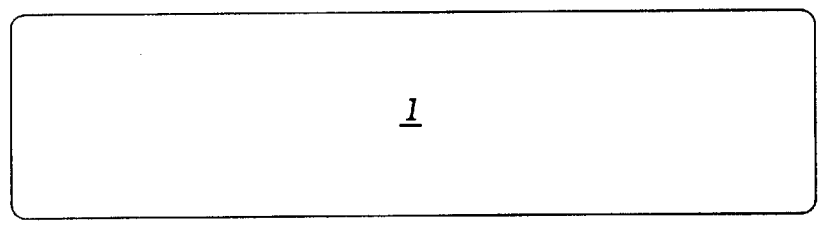
Fig. 5

FRAME HOLDING BEE FEEDER

BACKGROUND OF THE INVENTION

1. Field of the Invention

This invention relates generally to bee feeders, and more particularly, to a frame holding bee feeder to be placed inside a hive, and which has the capacity to store large quantities of liquid and solid foods for bees and, at the same time, to support frames to provide bees with safe and easy access to their food supply.

2. Description of Prior Art

Currently, there exists a variety of bee feeders that can be placed either inside or outside of hives. Although some success has been provided by such bee feeders, the weakness of the external feeders is that they are not selective and cannot control which bees should be administered the feed. They also lead to disturbances in bee populations from other hives taking the feed from the external feeder, called "robbing" by beekeepers.

There also exists external feeders that permit the allocation of feed to an assigned hive, by administering the feed directly in the front entrance of the hive. However, these external feeders still do not prevent robbing. Furthermore, these known external feeders have limited capacity for carrying feed (maximum of 2 liters).

The present invention, in contrast, is for use in the interior of a beehive, to both divide the hive and prevent contact between the feed supply and bees foreign to the colony it feeds, to, therefore, prevent robbing.

Feeders are also known for use inside a hive, and consist basically of three types, as described below.

A) Feeders which only use viscous or semisolid foodstuffs. These feeders are generally perforated bags which let bees extract the feed from the openings in the bags. However, these perforated bags have the inconvenience of requiring viscous feed to avoid spillage inside the hive. The viscous feed, however, is usually difficult to handle in large quantities, and tends to vary in viscosity according to temperature. Therefore, at higher ambient temperatures, the viscous food product can liquify, thereby causing severe spillage, and/or drowning of bees. Furthermore, this type of feeder does not allow storage of a large volume of feed.

The present invention allows the use of either liquid or viscous feed, without the danger of spillage, and can hold a large volume of feed (up to 12 liters of feed per feeder). Loading the feed into the present invention is very fast with liquid feed, since it can be pumped directly into the feeder.

B) Known feeders of liquid feed can be classified in two general categories:

1. Atmospheric: According to the definition by A. I. and E. R. Root—ABC and XYZ of beekeepers—Ed Hachette—Buenos Aires, Argentina). Atmospheric feeders utilize the principle of regulation of the dispensing of liquid feed they hold using atmospheric pressure. Such feeders consist of containers (usually bottles) having a wide opening filled with syrup, and are placed, upside down, over a tray with high walls. As bees take the liquid feed from the tray, air enters the container and forces the supply of feed down into the tray until the contents of the bottle or container are depleted. These internal feeders, however, have the inconvenience of having a low capacity of syrup or feed storage, and are difficult to load. Furthermore, placement of the feeder inside a hive is problematic due to the need to invert the container.

The present invention overcomes problems with known feeders and allows loading of the feed in the main part of the feeder, resulting in quick and easy loading and unloading.

2. Doolite feeders: These internal feeders consist of a rectangular-shaped container, open in its top face, and are placed inside the standard Langstroth size hive, replacing a frame and hung in the hive by tabs on its outer extremities. Doolite feeders are inconvenient to use because of their low storage capacity (3 liters). Furthermore, they take the place of a frame, and require the placement of floating elements on the liquid (such as wooden chips) to provide a stable platform for the bees, which come to the surface of the liquid to feed, so that the bees won't fall in the liquid and drown.

The present invention uses a larger volume container with standard frames inserted into the feeder, as a surface for the bees to stand on during feeding, and to crawl in and out of the feeder.

BRIEF SUMMARY OF THE INVENTION

Accordingly, it is a general object of the present invention to provide an improved bee feeder. It is a particular object of the present invention to provide an improved bee feeder having a higher storage capacity. It is a further particular object of the present invention to provide an improved bee feeder comprised of a stable system, based on focusing support on a lower face, which lower face is supported on the base of a beehive to, therefore, allow for a higher volume capacity feeder. It is a still further particular object of the present invention to provide an improved bee feeder with safer access for bees to a liquid surface, by allowing the bees to approach liquid in the feeder on a plurality of frames held in the feeder.

In accordance with one aspect of the present invention, there is provided a bee feeder comprised of a rectangular container having an open interior and an open top adapted to be placed inside a beehive, with at least one frame placed in the open top, so as to extend into the open interior while being supporting by side edges of the open top.

BRIEF DESCRIPTION OF THE DRAWINGS

The objects and features of the present invention which are believed to be novel, are set forth in particularity in the appended claims. The present invention, both as to its organization and manner of operation, together with further objectives and advantages, may best be understood by reference to the following description, taken in connection with the accompanying drawings, in which:

FIGS. 3–5 are a side elevational view, a cross-sectional view and a top view, respectively, of the feeding container of FIG. 1, with the two frames removed.

DESCRIPTION OF THE PREFERRED EMBODIMENTS

Figure 1:
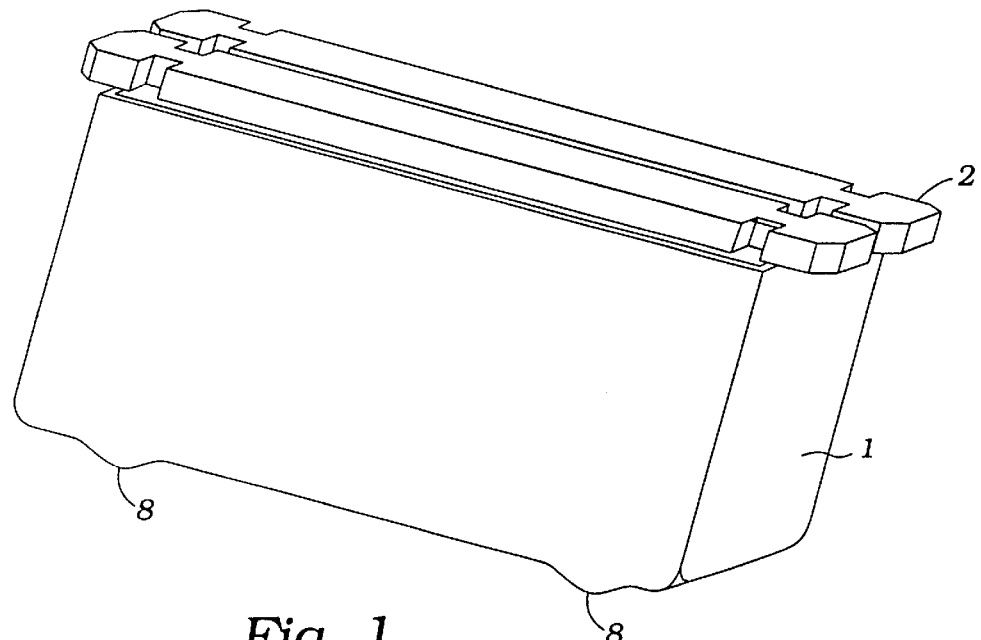
FIG. 1 is a partial perspective view of the novel bee feeder of the present invention supporting two frames therein.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for a novel and improved, substantially rectangular bee feeder, generally indicated at 1.

The body or container of the bee feeder 1 preferably consists of a metal or thermoplastic, substantially rectangular-shaped container, having an open top with an elongated, substantially rectangular closed base, having legs 8 formed thereon. The body also includes a pair of substantially rectangular closed end walls, a pair of substantially rectangular closed side walls, which, together with the base, enclose a hollow interior. This container 1 fits into a beehive 5, with a small space between the front and rear walls of the beehive and holds a plurality of standard frames in accordance with standard Langstroth measurements for beehives.

In the preferred embodiment of the present invention, the container 1 holds 1, 2, or 3 standard frames in the hive 5, depending on its selected width. The depth or length of this container 1 should be sufficient to hold a whole or portions of standard Langstroth size frames, and up to 12 liters of feed. In one embodiment, the container 1 is approximately 460 millimeters long, 215 millimeters high and 90 millimeters wide, and holds two standard frames (see FIGS. 1 and 2).

Due to its simple concept, the feeder 1 can be easily manufactured by using: 1. a polyethylene of high density, by molding or forming in a thermoplastic injection machine; 2. polyester with fiberglass; or 3. metal sheets, which can be formed by pressure, bending or welding. One way to produce the invention is by building a die or mold in the form of the feeding container, for use in a blow molding machine, or other similar machine. The material used could also be polyethylene of high density. The die or mold is mounted in the machine, and the container formed in a well known manner. After removing the formed container from the machine, the upper face of the container is cut off, and the final product is obtained.

As best shown in FIG. 1, the hollow interior of the feeder container 1 contains a plurality of frames 2 (two (2) being illustrated). These frames 2 are supported on the upper edges of the pair of rectangular ends of the container 1, about 3 millimeters apart and extend downwardly to the base of the container to allow bees to crawl on the frame while feeding.

Figure 2:
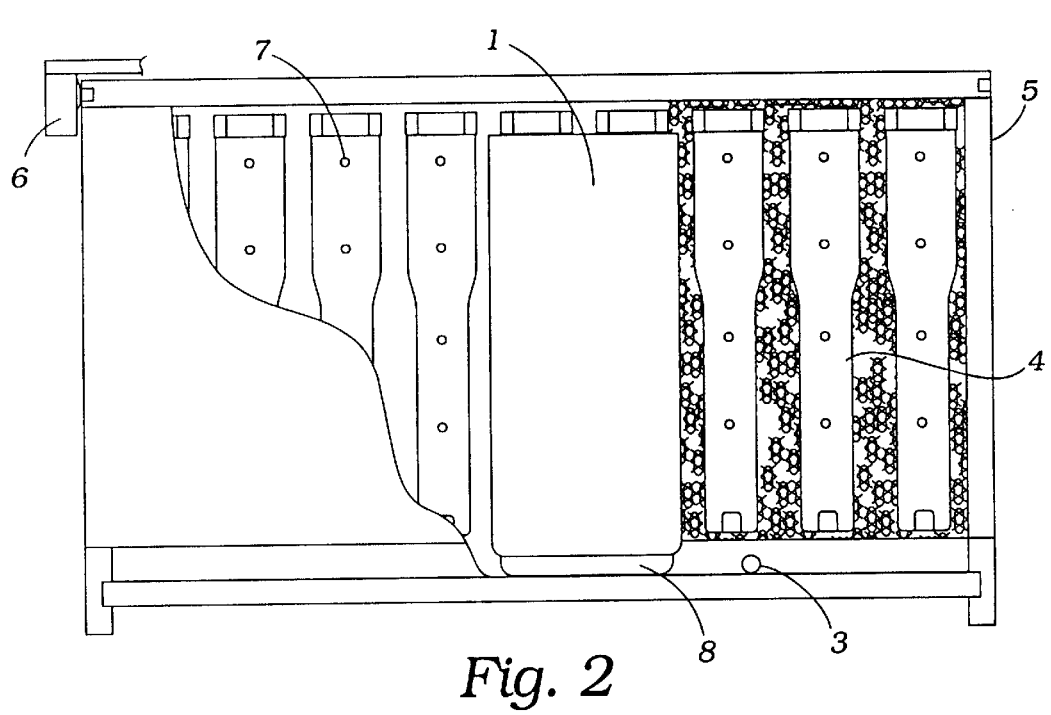
FIG. 2 is a front elevational view, partially in cross-section, of a beehive having a feeding container of FIG. 1, inserted therein and dividing the hive.

Turning now to FIG. 2, the beehive 5 is shown as having a single feeding container 1 supported therein. The hive 5 is also shown as having empty frames 7 and full frames 4, with the feeding container 1 separating the empty frames 7 and the full frames 4 occupied by bees and broods. The hive 5 also includes a ceiling or top 6 and a base or floor 3. The container 1 is supported on the base or floor 3 by legs 8 which provide a space of approximately 8 millimeters between the lower surface of the base of the container and the floor of the hive. This allows bees to crawl under the feeder when it rests on the floor the container. The bees will be supported on the structures of the frames while feeding at any level of liquid in the container.

Those skilled in the art will appreciate that various adaptations and modifications of the just described preferred embodiment can be configured without departing from the scope and spirit of the invention. Therefore, it is to be understood that, within the scope of the appended claims, the invention may be practiced other than is specifically described herein.

What is claimed is:

1. A bee feeder for insertion inside a beehive, comprising:
   a container having an open top, closed ends, closed side walls and a closed base to form a hollow interior, with at least one frame held in the hollow interior; and
   a plurality of legs sized and dimensioned to provide a separation of approximately 8 millimeters between a lower surface of the closed base and a floor of a beehive in which the container is adapted to be supported.

2. The bee feeder of claim 1 wherein the container takes the place of and supports a plurality of frames within a beehive.

3. The bee feeder of claim 2 wherein the container is substantially rectangular.

4. A bee feeder for insertion inside a beehive, comprising:
   a substantially rectangular container having a hollow interior bounded by a pair of closed end walls, a pair of closed side walls and a closed base with a plurality of legs;
   an open top, in communication with the hollow interior;
   a plurality of frames suspended by top portions of the pair of closed end walls; and
   the plurality of legs being sized and dimensioned so they can provide a clearance of approximately 8 millimeters between a lower surface of the closed base and a floor of a beehive in which the container is adapted to be supported.

5. The bee feeder of claim 4 wherein the plurality of frames are of standard Langstroth dimensions.

6. The bee feeder of claim 5 wherein the plurality of frames are spaced from the closed side walls and the closed base of the container a sufficient distance to provide space for bees to enter and feed on liquid feed held within the interior of the container.

7. The bee feeder of claim 6 wherein there are two legs on the container.

8. A bee feeder for insertion inside a beehive, comprising:
   a substantially rectangular container having a hollow interior sized and dimensioned to hold approximately 12 liters of feed;
   the substantially rectangular container having an open top, a pair of substantially rectangular closed end walls, a pair of substantially rectangular closed side walls and a substantially rectangular closed base having at least two legs bounding the hollow interior and the feed contained therein; and
   a pair of frames suspended from the pair of substantially rectangular closed end walls and extending into the hollow interior and any feed held therein; the pair of frames being spaced apart to allow bees to crawl on the pair of frames during feeding; and
   the at least two legs being adapted to form a space of approximately 8 millimeters between a lower surface of the substantially rectangular base and a floor of a beehive in which the container is adapted to be supported.

* * * * *